United States Patent
Lindenmuth et al.

(10) Patent No.: US 6,395,820 B1
(45) Date of Patent: May 28, 2002

(54) AQUEOUS POLYMER EMULSION-POLYESTER POLYOL BLEND FOR REDUCING OR ELIMINATING FLOODING AND FLOATING IN WATER-BASED TWO COMPONENT POLYURETHANE COATINGS

(75) Inventors: Denise Luise Lindenmuth, North Wales; Charles Raymond Hegedus, Coopersburg; Frank Ralph Pepe, Quakertown, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/439,445

(22) Filed: Nov. 15, 1999

(51) Int. Cl.$^7$ .............................. C08J 3/00; C08L 75/00; C08L 51/00; C08L 67/00; C08K 3/20
(52) U.S. Cl. .................. 524/501; 524/507; 524/539; 524/591; 524/839; 524/840; 525/123; 525/455
(58) Field of Search ................................ 524/591, 839, 524/840, 507, 501, 539; 525/455, 123

(56) References Cited

U.S. PATENT DOCUMENTS

| | | | | |
|---|---|---|---|---|
| 3,578,635 | A | | 5/1971 | Hardy et al. .................. 260/22 |
| 4,120,841 | A | | 10/1978 | Takahashi et al. ..... 260/29.6 H |
| 4,978,708 | A | | 12/1990 | Fowler et al. ............... 524/507 |
| 5,349,009 | A | * | 9/1994 | Furlan ......................... 524/563 |
| 5,397,646 | A | * | 3/1995 | Nickle et al. ............. 428/423.1 |
| 5,508,340 | A | | 4/1996 | Hart ........................... 524/591 |
| 5,552,477 | A | | 9/1996 | Dhein et al. ................ 524/840 |

FOREIGN PATENT DOCUMENTS

| | | |
|---|---|---|
| EP | 0394737 | 10/1990 |
| EP | 0700945 | 3/1996 |
| EP | 0792898 | 9/1997 |
| EP | 0934963 | 8/1999 |

OTHER PUBLICATIONS

Clive Hare, Protective Coatings Fundamentals of Chemistry and Composition, pp 456–457.

Taylor, J.R., Foster, H., "The Pigmentation of Acrylic Resins", JSDC Dec. 1969, pp 579–588.

Quednau, P, "How Polymeric Dispersants can Reduce Pigment Paste Stocks", Paint & Ink International, Jan./Feb. 1995, p 9.

"ADURA™ 50 Polyol for Waterborne Concrete Coatings" brochure from Air Products and Chemicals, Inc. Pub. No. 140–9908.

* cited by examiner

Primary Examiner—Patrick D. Niland
(74) Attorney, Agent, or Firm—Michael Leach

(57) ABSTRACT

A substantially solvent free, aqueous, pigmented, two component polyurethane-polyurea dispersion comprising:
(a) an aqueous mixture of an acid-containing polymeric polyol and a polyol free of acid groups, wherein the mixture has an average hydroxyl functionality of at least 1.5 and an acid number between about 15 and 200; and
an amine or a blend of amines having an average active hydrogen functionality of at least 1.5, the amine or blend of amines being present in a sufficient amount to substantially neutralize the acid-containing polymeric polyol;
(b) one or more polyisocyanates; and
(c) two or more different pigments;
characterized by reducing or eliminating flooding of the pigments with
(d) an aqueous polymer emulsion present in an amount sufficient to impart thixotropy to the mixture of (a) and (d).

21 Claims, No Drawings

AQUEOUS POLYMER EMULSION-POLYESTER POLYOL BLEND FOR REDUCING OR ELIMINATING FLOODING AND FLOATING IN WATER-BASED TWO COMPONENT POLYURETHANE COATINGS

BACKGROUND OF THE INVENTION

Waterborne, or water based, polyurethanes have been in existence for a number of years and there has been steady improvement in the performance properties of these materials to fit specific needs. Aqueous polyurethanes have been commercially attractive for a number of reasons, one of the most important of which is the elimination or substantial reduction of solvents and volatile organic compounds (VOC) emissions into the atmosphere. Another important reason relates to the performance of aqueous polyurethane systems which is now comparable to or better than conventional solvent-based polyurethanes for many applications.

Among the important advancements in this area have been water based and substantially solvent free, two component polyurethane-polyurea dispersions, also known simply as two component (2K) aqueous polyurethane dispersions. These dispersions are superior to well known one component aqueous dispersions of polyurethanes in which the polyurethanes are typically first formed in a solvent based system. The two component water based polyurethanes also match or exceed performance of two component solvent based polyurethane coatings while minimizing emission of organic solvents.

Two component waterborne polyurethanes tend to dry more slowly than two component solvent borne polyurethane coatings. This enables the waterborne coating molecules to have more mobility in the coating for longer periods of time, until coalescence can occur. However, this longer open time allows particles of different pigments to segregate causing "flooding"/"floating" at the surface.

Presently, there are aqueous acid functional polyester polyol compositions which can be reacted with conventional isocyanates, such as either hexamethylene diisocyanate (HDI) or isophorone diisocyanate (IPDI) trimer. When such two component systems contain two different pigments, they exhibit a flooding and/or floating problem and do not respond to typical approaches in solving flooding/floating behavior such as listed in Clive Hare's book, *Protective Coatings Fundamentals of Chemistry and Composition*. On pages 456–457, the author describes "floating" behavior as mottled or blotchy color variations in the dry coating caused by one or more of the following differences: particle sizes. two types of pigments, extent of pigment flocculation, surface tension, density or temperature gradients formed by currents as the paint dries. On the other hand, "flooding" causes a uniform color on the coating surface but variations in color throughout the coating thickness caused by different rates of pigment settling in the applied film. These various rates can be due to differences in pigment size, density, shape, or degree of flocculation. Flooding can be affected by temperature, and humidity and intensified by low viscosity. slow dry times and thick films. Some traditional solutions for eliminating flooding/floating behavior, as described in Clive Hare's book, are to use low surface energy flow agents or thixotropes, to match pigment sizes used in dispersions, to normalize degree of pigment dispersion, or to decrease dry time.

Unfortunately, with the water based, two component polyurethane-polyurea systems based on aqueous acid functional polyester polyols, these traditional approaches were not successful in eliminating the flooding behavior.

Water based, two component polyurethane-polyurea systems are described in the following patents:

U.S. Pat. No. 5,508,340 discloses a substantially solvent free, aqueous two-component coating composition in which the first component is an aqueous polyol phase containing an acid-containing polyol combined with an amine phase containing one or more amines having active hydrogens that are reactive with isocyanate groups. The second component is one or more polyisocyanates. Example 9 shows a black pigmented solution prepared using 100 wt parts aqueous polyol/amine, 25 parts acid functional acrylic resin, 20 parts water, and 10 wt parts black pigment dispersion. The aqueous polyol/amine comprises an acid-containing polyol, a nonacidic aromatic polyester diol, trimethylol propane and an amine blend. 100 parts of this black pigmented solution is then reacted with 50 parts of HDI trimer at NCO/OH=2/1. Since there is only one type of pigment present in the formulation, no apparent or visual flooding or floating would be evident.

U.S. Pat. No. 5,552,477 discloses a binder for a coating system which consists of a polyol component and a polyisocyanate component. The polyol component consists of a high molecular weight (Mn>500) acid containing polyol which is water dilutable and possesses hydroxyl groups, and a reactive diluent containing a low molecular weight polyol (Mn<500) which has at least one group that is reactive with isocyanates.

U.S. Pat. No. 4,120,841 discloses an acid functional acrylic copolymer for use in aqueous paints as a levelling agent to primarily eliminate craters and improve gloss, but to also prevent or decrease flooding by increasing wettability of the pigments.

J. R. Taylor and H. Foster, "The Pigmentation of Acrylic Resins", JSDC December 1969, pp 579–588, recommends eliminating flooding and floating in solvent borne acrylic coatings by the addition of small amounts of silicone fluid (M.S. 200) or incorporation of a silicone treated calcium carbonate during the mill charge. The pigment particle size and surface treatment will also greatly affect degree of flocculation, therefore affecting flooding and floating. It is critical in coatings formulated using waterborne acrylic dispersions that the correct surfactants are chosen in the pigment dispersions. To ensure optimum color stability in the paint, surfactants with suitable HLB (hydrophilic lipophilic balance) values for the pigments used must be chosen.

P. Quednau, "How polymeric dispersants can reduce pigment paste stocks", Paint & Ink International, January/February 1995, p 9 states that a major problem in the coatings industry is the flooding and floating behavior of some pigment dispersions. Pigment concentrates based on high molecular weight polymeric dispersants, either polyurethane or polyacrylate based, are recommended to achieve good pigment stability without flooding and floating. Both types of dispersants contain tertiary amines leading to strong adsorption on the pigment surfaces due to their basic character. These dispersants need to have a high molecular weight of 10,000–25,000 to be effective in steric hindrance and deflocculation of the pigment particles.

U.S. Pat. No. 4,978,708 discloses aqueous-based basecoat compositions comprising an anionic polyurethane principal resin and an anionic acrylic pigment grind resin. The coating compositions are alleged to exhibit good pigment wetting and dispersion characteristics with improved shelf life and color stability.

U.S. Pat. No. 3,578,635 discloses certain halogenated carbon blacks as pigments in the preparation of paint and lacquer compositions which possess excellent non-flooding properties and excellent tinting properties.

SUMMARY OF THE INVENTION

This invention is directed to a blend of an aqueous polymer emulsion with an aqueous pigmented polyol/amine composition and to its use in the production of a substantially solvent free, aqueous, pigmented two component polyurethane-polyurea coating composition. The pigmented polyol/amine composition contains at least one acidic polyol and at least one non-acidic polyol together with one or more amines and two or more different pigments, all in water. One or more reactive polyisocyanates can be combined with the aqueous mixture of the polymer emulsion and the pigmented polyol/amine composition to form a water based, substantially solvent free, pigmented two component polyurethane-polyurea dispersion which is useful in coating systems and exhibits substantially reduced or no pigment flooding or floating.

The polymer emulsion should be compatible with the pigmented polyol/amine composition. The polymer emulsion is used in an amount sufficient to afford a thixotropic mixture when mixed with the polyol/amine composition, preferably to afford a thixotropic mixture when mixed with the pigmented polyol/amine composition. The thixotropic mixture should be compatible with the polyisocyanate and ideally yield a thixotropic composition.

It was unexpectedly found that. by adding the polymer emulsion to the pigmented polyol/amine composition, the flooding problem associated with the two pigments in a water based, pigmented two component polyurethane-polyurea dispersion was substantially reduced or even eliminated.

DETAILED DESCRIPTION OF THE INVENTION

The aqueous polymer emulsion can comprise a polymer or mixture of polymers, preferably having a Tg greater than ambient temperature; i.e., greater than about 20° C. Suitable polymer emulsions for use in this invention include, for example, aqueous emulsions, or dispersions, of acrylics; copolymers of acrylics with styrene, substituted styrene, butadiene and/or acrylonitrile; vinyl acetate polymers and copolymers; ethylene copolymers with one or more other monomers such as vinyl acetate and vinyl chloride; alkyd resins; epoxies; polyurethanes and polyesters including polyester polyols. The polymer of the aqueous polymer emulsion preferably contains acid functionality such as resulting from the incorporation of acid functional monomers into the polymer.

The polymer emulsion should be compatible with the pigmented polyol/amine composition. Compatibility of the aqueous mixture of pigmented polyol/amine composition and the polymer emulsion can be determined by various methods. For example, visual observation of a compatible blend of polyol/amine and polymer emulsion will show little or no coagulation, gelation, or separation for an extended period of time, e.g., >one year at RT. Liquid specimens can be maintained in a closed container and evaluated periodically for separation, gelation, and/or coagulation.

The preferred aqueous polymer emulsions, or latexes, of this invention comprise polymers based on the free radical polymerization of about 10 to 100 wt % of one or more acrylic or methacrylic monomers and 0 to 90 wt % of one or more other monomers. Preferred emulsion polymers are those based on 50 to 100 wt % of one or more acrylic monomers and 0 to 50 wt % of one or more other monomers. Acrylic monomer, as used here, refers to acrylic acid (AA) and methacrylic acid and their salts and esters. Examples are acrylic acid and/or methacrylic acid, methyl acrylate, methyl methacrylate (MMA), ethyl acrylate, n-propyl acrylate, iso-propyl acrylate, n-butyl acrylate (BA), n-butyl methacrylate, and 2-ethylhexyl acrylate. It is preferred that the polymer contain polymerized units of acrylic and/or methacrylic acid at >0 to 90 wt %, preferably 10 to 30 wt %.

Examples of other polymer latexes, or dispersions, are those based on polyvinyl acetate and its copolymers; copolymers of ethylene and vinyl chloride and/or vinyl acetate; copolymers of acrylic or methacrylic acid or esters with styrene or substituted styrene, butadiene, and acrylonitrile; alkyds; urethane; epoxies; polyurethanes and polyesters.

It is also contemplated that the aqueous polymer emulsion can be replaced with a redispersible polymer powder since the polyol/amine compositions contain water.

Appropriate polyol/amine compositions for use in this invention are described in detail in U.S. Pat. Nos. 5,352,733 and 5,508,340 which are hereby incorporated by reference.

The polyol portion of the polyol/amine composition comprises one or more acid containing polyols and one or more non-acid containing polyols which provides a hydroxyl functionality of at least 1.5; preferably 2, and an acid number of between about 15 and 200. By acid containing polyol is meant acidic polymeric polyols which will provide the overall polyol portion with an acid number of between about 15 and 200. Preferred acid containing polyols are polyester polyols containing a carboxylic acid or sulfonic acid group. The polyester polyols can be prepared by the esterification of organic polycarboxylic acids or anhydrides with organic polyols. Usually, the polycarboxylic acids and polyols are aliphatic or aromatic dibasic acids and diols but trifunctional acids and tri- or higher functional polyols may be utilized. The polyol portion can contain a variety of components or blend of components provided the stated criteria for hydroxyl functionality and acid number are met. The invention is not to be restricted to any particular acidic polyol inasmuch as combinations of acidic polyols may be utilized. Non-acid containing polyols include low molecular weight diols, triols and higher alcohols, low molecular weight amide-containing polyols and higher polymeric polyols such as polyester polyols, polyether polyols and hydroxy-containing acrylic copolymers.

A variety of amines or blends of amines can be utilized as long as the amine phase, or component, contains active hydrogens reactive with isocyanate groups such that the average active hydrogen functionality of the overall amine composition is at least 1.5 or greater and the amines are present in an amount that substantially neutralizes the acidic functionality of the polyol. Suitable amines or blend of amines comprise primary and secondary aliphatic, cycloaliphatic and aromatic amines; tertiary aliphatic amines; alkanol amines, dialkanol amines, trialkanol amines; polyamines such as oxyalkyleneamines; and mixtures thereof. Ammonia and amines not having an active hydrogen or having insufficient active hydrogens, e.g., tertiary alkyl amines, can be utilized for their neutralizing ability provided the overall amine composition has an average active hydrogen functionality of at least 1.5. Primary and/or secondary amines are preferred.

To formulate the polyol/amine composition, the acidic and non-acidic polyols of the polyol phase are preferably blended in a mixing tank with water at ambient temperature, the amines being present in the polyols or the water, resulting in an overall aqueous polyol/amine composition having a "solids", or actives, content of between about 33 and 95 wt %. The mixture can contain any desired additives such as defoaming agents, surface tension reducing agents, agents to regulate pH, etc. Preferred aqueous polyol/amine compositions are marketed as ADURA® 100 and 200 polyols by Air Products and Chemicals, Inc.

The pigmented two component polyurethane coating composition of the invention comprises a two pigment system. "Two pigment" system means at least two pigments differing in color. Suitable pigments for use in the coating compositions are those pigments known in the polyurethane coating art and include, for example, titanium dioxide, carbon black, red iron oxide, yellow iron oxide, black iron oxide, phthalocyanine blue, phthalocyanine green. zinc phosphate or other anticorrosive pigments, benzidine orange, benzidine yellow, carbizole violet, chrome yellow, molybdate red, cobalt blue or green and other organic pigments such as Monozo-based and diazo-based colors. The amount of pigment ranges from >0 to 50%, preferably 13 to 30%, based on pigment volume concentration (PVC).

A preferred method for preparing the modified aqueous pigmented two component polyurethane-polyurea dispersion is to first blend the polyol/amine dispersion with the polymer emulsion and water and then add the pigments. An effective blend of polymer emulsion and polyol/amine composition contains sufficient polymer emulsion to afford a thixotropic mixture, such effective amounts being about >0 to 50 wt % aqueous polymer emulsion and <100 to 50 wt % aqueous polyol/amine composition, preferably 5 to 20 wt % aqueous polymer emulsion and 95 to 80 wt % aqueous polyol/amine composition; or correspondingly, based on active components, >0 to 35 wt % emulsion polymer and <100 to 65 wt % polyol/amine composition, preferably 5 to 15 wt % emulsion polymer and 95 to 85 wt % polyol/amine composition. "Active" components comprises the polymers, polyols and amines, i.e., compounds other than the liquid dispersing medium which comprises at least 85 wt %, preferably at least 95 wt %, water. Obviously, an all water medium is also included and most preferred.

It is preferred that the polymer emulsion first be preblended with the same or a different polyol/amine composition to afford a preblend comprising 80 to 95 wt % of the aqueous polymer emulsion. This preblend, which need not itself be thixotropic and in most cases will not be, is then added in sufficient amount to the polyol/amine composition to yield a thixotropic mixture. The amount of each component ultimately is dictated by the properties desired when the mixture is applied as a film after addition of the polyisocyanate and curing.

The organic polyisocyanate is any well known isocyanate in the art for polyurethane coatings. For example, it can be an aliphatic, a cycloaliphatic or an aromatic polyisocyanate, or mixtures thereof. Aliphatic or cycloaliphatic polyisocyanates are preferred. Trimers of diisocyanates are also preferred although other polyisocyanates can be used. Particularly preferred isocyanate adducts are those based on hexamethylene diisocyanate (HDI). Hexamethylene diisocyanate trimer is the preferred isocyanate material.

The two component polyurethane-polyurea dispersion is formed by blending at least 0.5 isocyanate equivalents for each active hydrogen equivalent of the pigmented polyol/amine component. Preferably, there will be between about 1.1 and 3 isocyanate equivalents for each active hydrogen equivalent of the pigmented polyol/amine component with 1.3 to 2.0 isocyanate equivalents being especially preferred.

For heat cured systems, the preferred isocyanate to active hydrogen ratio is 1.0 to 1.3.

Optional additives, such as catalysts, flow control agents, and thickeners, are preferably added to the polyol/amine composition at the same time as the polymer emulsion; however they can also be added before or after addition of the isocyanate component.

Polyisocyanate can be added to the blend of pigmented polyol/amine and polymer emulsion by ordinary mixing at room temperature. This composition, when fully cured, produces a crosslinked film having properties which are equal to or exceed solvent-based two component polyurethanes as well as other known aqueous-based two component polyurethanes with substantially reduced or eliminated floating/flooding of the pigments.

After addition of the polyisocyanate, the mixture has a limited pot life within which it should be applied to a substrate. Typically the pot life ranges from 1 to about 4 hours. The mixture is suitable for coating a variety of surfaces; for example, wood, concrete, plastic, masonry, and metallic substrates.

A preferred method for preparing the two component polyurethane coating composition comprises (1) preparing a white pigment grind, (2) adding the grind to the aqueous polyol/amine composition, (3) adding an aqueous preblend of acrylic polymer emulsion and a polyol/amine composition, (4) mixing in the additives, (5) adding the tints and (6) blending in the isocyanate.

The following examples demonstrate that the addition of an aqueous acrylic polymer emulsion to an aqueous polyol/amine-containing blue paint formulation significantly lowers flooding as measured by Delta E color change throughout the pot life. Delta E is a measure of the total color change and is defined as:

$$\text{Delta } E = \{(\text{Delta } L)^{2^*}(\text{Delta } a)^{2^*}(\text{Delta } b)^2\}^{0.5}$$

where Delta L is the difference in lightness (black-white scale), Delta a is the difference in the red-green scale, and Delta b is the difference in the blue-yellow scale. Delta E values of <1 are typically undetectable with the naked eye, however Delta E values ~5 or greater are extremely noticeable.

GLOSSARY OF MATERIALS USED IN THE EXAMPLES

Acrylic Emulsion—a 36 wt % aqueous acrylic polymer emulsion, polymer comprises
  MMA (48 wt %)/BA(32 wt %)/AA(20 wt %); Tg~47° C.
Acrylic/Polyol—87/13 blend of Acrylic Emulsion and ADURA 100 polyol
ADURA 100 polyol (acid functional polyol/amine) from Air Products and Chemicals, Inc
Bayhydur XP7063 water dispersible isocyanate based on HDI from Bayer
Byk 348 surfactant from Byk-Chemie
Byk 380 surfactant from Byk-Chemie
DeeFo PI-4 defoamer from Ultra Additives
Desmodur N3300 HDI trimer from Bayer
DisperByk 190 surfactant from Byk-Chemie
Foamex 805 defoamer from Tego Chemie K-Kat 6212A catalyst from King Industries
Surfynol 504 surfactant from Air Products and Chemicals, Inc.
TintAyd NV7292 pigment dispersion from Elementis Specialties
Tinuvin 1130 UV absorber from Ciba-Geigy
Tinuvin 292 light stabilizer from Ciba-Geigy
TiPure R960 $TiO_2$ from DuPont

EXAMPLE 1A

The following resin-free grind formulation was used in the formulations, unless otherwise stated, and will be referred to as "Grind 1A".

| Resin-Free Grind 1A | |
|---|---|
| Deionized Water | 2631.6 g |
| DisperByk 190 | 495.5 g |
| TiPure R960 | 10277.0 g |
| Deionized Water | 557.2 g |

The first two ingredients were mixed with mild agitation for 5 minutes using a cowles blade. The $TiO_2$ was added slowly under medium shear agitation to maintain a mixing vortex in the center of the grind. Mixing continued for 10–15 minutes until the grind reached a Hegman 4–5. after which the second portion of deionized water was added while mixing until uniform. The mixture was passed once through a mill which contained 1 mm glass beads filled to 70% capacity of the chamber volume. The mill was run at approximately 2500 rpm with adjustments made to maintain good fluid flow and a temperature less than 40° C. The final Grind 1A exhibited a Hegman grind equal to 7+.

EXAMPLE 1B

| Part A: | |
|---|---|
| Adura 100 Polyol | 5992.00 g |
| Grind 1A | 11655.00 g |
| DeeFo PI-4 | 10.10 g |
| Tinuvin 292 | 31.10 g |
| Tinuvin 1130 | 31.00 g |
| Surfynol 504 | 23.90 g |

Grind 1A was added to the Adura 100 polyol and mixed for 5 minutes. The next four ingredients were added under medium shear into the vortex. After all of the ingredients are added, the combination was mixed for 15 minutes.

Part A (402.15 g) was then tinted blue with TintAyd NV7292 phthalo blue pigment dispersion (9.87 g) and mixed thoroughly to yield Paint 1 B.

EXAMPLE 2

| Part A: | |
|---|---|
| Grind 1A | 225.70 g |
| Adura 100 Polyol | 92.82 g |
| Acrylic/Polyol | 23.20 g |
| DeeFo PI-4 | 0.19 g |
| Tinuvin 292 | 0.60 g |
| Tinuvin 1130 | 0.60 g |

| -continued | |
|---|---|
| Part A: | |
| Surfynol 504 | 0.46 g |
| TintAyd NV7292 | 8.43 g |

The above ingredients were added to a container one at a time in the order listed above under agitation. An air mixer was used at medium shear to maintain a good mixing vortex. After all of the ingredients are added, the combination is mixed for 15 minutes. The total mixing time was approximately 45 minutes yielding Paint 2.

EXAMPLE 3

| Part A: | |
|---|---|
| Grind 1A | 225.70 |
| Adura 100 Polyol | 92.82 |
| Acrylic/Polyol | 23.20 |
| DeeFo PI-4 | 0.19 |
| Surfynol 504 | 0.46 |
| TintAyd NV7292 | 8.43 |

The above ingredients were mixed in the same manner as Example 2. After thoroughly mixed, 0.19 g each of Tinuvin 292 and Tinuvin 1130 additives were added one at a time under medium agitation to 110 g of Part A. After complete addition, the composition was mixed for 15 minutes yielding Paint 3.

EXAMPLE 4

This Example 4 uses a different grind than Grind 1A used in Examples 1–3.

| Grind 4 | |
|---|---|
| Deionized Water | 26.08 g |
| Disperbyk 190 | 26.08 g |
| Byk 348 | 3.40 g |
| Foamex 805 | 2.79 g |
| TiPure R960 | 261.13 g |
| Deionized Water | 18.68 g |

| Letdown: | |
|---|---|
| Adura 50 | 730.40 g |
| Byk 380 | 12.00 g |
| Foamex 805 | 7.52 g |

The Grind 4 ingredients were added one at a time under medium agitation. The agitation was increased while adding the $TiO_2$ to maintain a good mixing vortex. Mixing was complete after 20 minutes when the grind reached a Hegman 7+.

The letdown ingredients were added to Grind 4 one at a time under medium agitation and mixed for 20 minutes to yield Paint 4.

EXAMPLE 5

Paint 4 (200 g) and TintAyd NV7292 phthalo blue pigment dispersion (2.45 g) were mixed under medium shear until thoroughly mixed (approximately 10 minutes) to yield Paint 5.

RUN 1

26.86 grams of Desmodur N3300/K-Kat 6212A (96.8/3.2) mixture were added to 75 grams of Paint 1 B and mixed well (2 minutes) with a tongue depressor. This mixture was then reduced with 10.1 grams of water in 5 g increments to a viscosity of 9 seconds in a Zahn #3 cup. Drawdowns were made throughout the pot life on Bondrite 952 (zinc phosphated) steel panels using a 10 mil wet film thickness wire wound drawdown rod. After the coatings cured at 22° C. for at least 24 hours, color measurements were made using a D65 standard illuminant and 10° standard observer.

RUN 2

22.43 grams of Desmodur N3300/K-Kat 6212A (96.8/3.2) mixture were added to 75 grams of Paint 2 and mixed well (2 minutes) with a tongue depressor. This mixture was then reduced with 15.7 grams of water in 5 g increments to a viscosity of 12 seconds in a Zahn #3 cup. Drawdowns and color measurements were made as described in Run 1.

Comparing Run 1 (Adura 100 only) with Run 2 (20 wt % Acrylic/Polyol/80 wt % Adura 100) a great improvement in resistance to flooding due to the addition of Acrylic/Polyol is observed. Table 1 illustrates the decrease of flooding in Run 2 vs. Run 1 as seen in the minimal change in overall color throughout the pot life expressed in Delta E values.

TABLE 1

| Sample | Pot Life (hr) | Delta E |
|---|---|---|
| Run 1 | 0.12 | 0.00 |
| No Acrylic/Polyol | 1.00 | 1.70 |
|  | 2.00 | 4.05 |
|  | 3.00 | 6.89 |
|  | 4.00 | 8.74 |
| Run 2 | 0.17 | 0.00 |
| 20% Acrylic/Polyol | 1.00 | 1.09 |
|  | 2.17 | 2.13 |
|  | 3.17 | 2.38 |

22.43 grams of Desmodur N3300/K-Kat 6212A (96.8/3.2) mixture were added to 75 grams of Paint 3 and mixed well (2 minutes) with a tongue depressor. This mixture was then reduced with 14.57 grams of water in 5 g increments to a viscosity of 8 seconds in a Zahn #3 cup. Drawdowns and color measurements were made as described in Run 1.

Comparing Run 1, which contained only Adura 100 polyol, to Run 3, which contained 20 wt parts Acrylic/Polyol and 80 wt parts Adura 100 polyol. again shows decreased flooding due to the presence of Acrylic/Polyol. Table 2 shows the decrease of flooding in Run 3 vs. Run 1 as visible in the minimal change in overall color throughout the pot life expressed in Delta E values. Run 3 was essentially a repeat of Run 2 except the order of addition of the Tinuvin additives was different. The Tinuvin additives were added last to Paint 3, whereas in Run 2, they were added to Paint 2 prior to the addition of Surfynol 504 surfactant and the TintAyd NV7292 phthalo blue pigment dispersion.

TABLE 2

| Sample | Pot Life (hr) | Delta E |
|---|---|---|
| Run 1 | 0.12 | 0.00 |
| No Acrylic/Polyol | 1.00 | 1.70 |
|  | 2.00 | 4.05 |

TABLE 2-continued

| Sample | Pot Life (hr) | Delta E |
|---|---|---|
|  | 3.00 | 6.89 |
|  | 4.00 | 8.74 |
| Run 3 | 0.17 | 0.00 |
| 20% Acrylic/Polyol | 1.00 | 0.31 |
|  | 2.00 | 0.24 |
|  | 3.00 | 0.65 |
|  | 4.00 | 1.11 |

RUN 4

11.15 grams of Bayhydur XP7063 isocyanate were added, during mechanical agitation, to 100 grams of Paint 5 and mixed well (2 minutes). This mixture was then reduced with 23 grams of water added slowly under medium agitation to a viscosity of 9 seconds in a Zahn #3 cup. Drawdowns and color measurements were made as described in Run 1.

There was very little flooding observed in Run 4 when compared to Run 1 as shown in Table 3.

TABLE 3

| Sample | Pot Life (hr) | Delta E |
|---|---|---|
| Run 1 | 0.12 | 0.00 |
| No Acrylic/Polyol | 1.00 | 1.70 |
|  | 2.00 | 4.05 |
|  | 3.00 | 6.89 |
|  | 4.00 | 8.74 |
| Run 4 | 0.28 | 0.00 |
| 100% Acrylic/Polyol | 1.33 | 0.55 |
|  | 2.00 | 0.87 |
|  | 3.25 | 1.23 |
|  | 4.25 | 1.41 |

This result is not surprising based on the quick dry times observed for the coatings applied in Run 4 containing 100% Acrylic/Polyol vs. the long dry times in Run 1 containing 100% Adura 100 polyol. However, it is surprising that the addition of small amounts of Acrylic/Polyol (20 wt %) eliminates the significant amount of flooding present in an Adura 100 coating without affecting the dry times. The dry time results are shown in Table 4.

TABLE 4

| Dry Times (hr) | Run 1 | Run 2 | Run 3 | Run 4 |
|---|---|---|---|---|
| Set to Touch | 2.50 | 1.50 | 2.00 | 0.33 |
| Tack Free | 5.00 | 4.00 | 5.00 | 0.75 |
| Dry Through | 8.00 | 8.00 | 8.50 | 0.75 |
| Wt % Acrylic/Polyol in Polyol | 0 | 20 | 20 | 100 |

According to the rule of mixtures, a slight improvement in flooding resistance would be expected when adding 20 wt % of a polymer that does not flood in a formulated paint to 80 wt % of a polymer that does flood in a paint. This expected slight improvement in flooding resistance would be similar to the slight decrease in dry time observed in Runs 2 and 3 (20 wt % Acrylic/Polyol/80 wt % Adura 100) vs. Run 1 (100% Adura 100). Instead, there is a significant improvement in flooding observed in an Adura 100 coating containing 20 wt % Acrylic/Polyol, which is more characteristic of a coating containing 100 wt % Acrylic/Polyol.

Without being bound to any particular theory, the lack of flooding in Runs 2 and 3 was not due to a dramatic decrease in dry time, but instead to the thixotropic effect of the acrylic polymer emulsion added to the Adura 100 polyol. This would also explain why Run 3 containing 20 wt % Acrylic/Polyol exhibited slightly less flooding than Run 4 containing 100% Acrylic/Polyol.

STATEMENT OF INDUSTRIAL APPLICATION

The invention provides a method for reducing or eliminating the flooding and floating effect in pigmented aqueous two component polyurethane-polyurea coating compositions.

What is claimed is:

1. In a substantially solvent free, aqueous, pigmented, two component polyurethane-polyurea dispersion prepared from:
   (a) an aqueous mixture of an acid-containing polymeric polyol and a polyol free of acid groups, wherein the mixture has an average hydroxyl functionality of at least 1.5 and an acid number between about 15 and 200; and
   an amine or a blend of amines having an average active hydrogen functionality of at least 1.5, the amine or blend of amines being present in a sufficient amount to substantially neutralize the acid-containing polymeric polyol;
   (b) one or more polyisocyanates; and
   (c) two or more different pigments;
the improvement for reducing or eliminating flooding of the pigments which comprises
   (d) an aqueous polymer emulsion comprising a polymer prepared by aqueous emulsion free radical polymerization, the polymer emulsion present in an amount sufficient to impart thixotropy to a mixture of (a) and (d).

2. The aqueous two-component polyurethane-polyurea dispersion of claim 1 in which the emulsion polymer contains acid functionality and has a Tg of 20° C. or higher.

3. The aqueous two component polyurethane-polyurea dispersion of claim 1 which contains >0 to 50 wt % polymer emulsion component (d) and <100 to 50 wt % polyol/amine component (a).

4. The aqueous polyurethane-polyurea dispersion of claim 1 in which the emulsion polymer comprises polymerized monomers selected from the group consisting of acrylic acid or its salts, methacrylic acid or its salts, an acrylic ester, a methacrylic ester, and mixtures thereof.

5. The aqueous polyurethane-polyurea dispersion of claim 1 in which the emulsion polymer comprises 10 to 100 wt % of monomers selected from the group consisting of acrylic acid or its salts, methacrylic acid or its salts, methyl acrylate, methyl methacrylate, ethyl acrylate, n-propyl acrylate, isopropyl acrylate, n-butyl acrylate, n-butyl methacrylate, 2-ethylhexyl acrylate, and mixtures thereof.

6. The aqueous polyurethane-polyurea dispersion of claim 2 in which the emulsion polymer comprises 50 to 100 wt % of polymerized monomers consisting of acrylic acid or its salts, methacrylic acid or its salts, methyl acrylate, methyl methacrylate, ethyl acrylate, n-propyl acrylate, isopropyl acrylate, n-butyl acrylate, n-butyl methacrylate, 2-ethylhexyl acrylate, and mixtures thereof.

7. The aqueous polyurethane-polyurea dispersion of claim 2 in which the emulsion polymer consists essentially of polymerized methyl methacrylate, acrylic acid or its salts, and n-butyl acrylate.

8. The aqueous polyurethane-polyurea dispersion of claim 1 in which the two or more pigments of component (c) are selected from the group consisting of titanium dioxide, carbon black, red iron oxide, yellow iron oxide, black iron oxide, phthalocyanine blue, phthalocyanine green zinc phosphate or other anticorrosive pigments, benzidine orange, benzidine yellow, carbizole violet, chrome yellow, molybdate red, cobalt blue, cobalt green, Monozo-based colors and diazo-based colors.

9. The aqueous polyurethane-polyurea dispersion of claim 1 in which the aqueous polymer emulsion is preblended with a polyol/amine composition which is the same as component (a).

10. The aqueous polyurethane-polyurea dispersion of claim 1 in which the aqueous polymer emulsion is present in an amount sufficient to impart thixotropy to a mixture of (a), (c) and (d).

11. A substantially solvent free, aqueous, pigmented, two component polyurethane-polyurea dispersion prepared by combining:
   (a) an aqueous mixture of an acid-containing polymeric polyol and a polyol free of acid groups, wherein the mixture has an average hydroxyl functionality of at least 2 and an acid number between about 15 and 200; and
   an amine or a blend of amines having an average active hydrogen functionality of at least 2, the amine or blend of amines being present in a sufficient amount to substantially neutralize the acid-containing polymeric polyol;
   (b) one or more polyisocyanates in which the ratio between isocyanate equivalents and the sum of active hydrogen equivalents of the polyols and amines of component (a) is at least 0.5:1;
   (c) two or more different pigments; and
   (d) an aqueous polymer emulsion comprising a polymer having a Tg of 20° C. or higher and comprising aqueous emulsion polymerized monomers selected from the group consisting of acrylic acid or its salts, methacrylic acid or its salts, an acrylic ester, a methacrylic ester, styrene, substituted styrene, ethylene, vinyl chloride, vinyl acetate, butadiene, acrylonitrile and mixtures thereof, the aqueous polymer emulsion present in an amount sufficient to impart thixotropy to a mixture of (a) and (d).

12. The aqueous polyurethane-polyurea dispersion of claim 11 in which the emulsion polymer comprises 10 to 100 wt % of monomers selected from the group consisting of acrylic acid or its salts, methacrylic acid or its salts, methyl acrylate, methyl methacrylate, ethyl acrylate, n-propyl acrylate, isopropyl acrylate, n-butyl acrylate, n-butyl methacrylate, 2-ethylhexyl acrylate, and mixtures thereof.

13. The aqueous polyurethane-polyurea dispersion of claim 11 in which the emulsion polymer comprises 50 to 100 wt % of monomers selected from the group consisting of acrylic acid or its salts, methacrylic acid or its salts, methyl acrylate, methyl methacrylate, ethyl acrylate, n-propyl acrylate, isopropyl acrylate, n-butyl acrylate, n-butyl methacrylate, 2-ethylhexyl acrylate, and mixtures thereof.

14. The aqueous polyurethane-polyurea dispersion of claim 13 in which the emulsion polymer comprises polymerized monomers selected from the group consisting of acrylic acid or its salts, methacrylic acid or its salts, an acrylic ester, a methacrylic ester, and mixtures thereof.

15. The aqueous polyurethane-polyurea dispersion of claim 11 in which the emulsion polymer consists essentially of polymerized methyl methacrylate, acrylic acid or its salts, and n-butyl acrylate.

16. The aqueous polyurethane-polyurea dispersion of claim 13 in which the two or more pigments of component (c) are selected from the group consisting of titanium dioxide, carbon black, red iron oxide, yellow iron oxide, black iron oxide, phthalocyanine blue, phthalocyanine green, zinc phosphate or other anticorrosive pigments, benzidine orange, benzidine yellow, carbizole violet, chrome yellow, molybdate red, cobalt blue, cobalt green, Monozo-based colors and diazo-based colors.

17. The aqueous polyurethane-polyurea dispersion of claim 13 in which the aqueous polymer emulsion is preblended with a polyol/amine composition which is the same as component (a).

18. The aqueous polyurethane-polyurea dispersion of claim 13 in which the aqueous polymer emulsion is present in an amount sufficient to impart thixotropy to a mixture of (a), (c) and (d).

19. The aqueous polyurethane-polyurea dispersion of claim 1 in which the aqueous polymer emulsion is present in an amount sufficient to impart thixotropy to a mixture of (a), (b), (c) and (d).

20. The aqueous polyurethane-polyurea dispersion of claim 13 in which the aqueous polymer emulsion is present in an amount sufficient to impart thixotropy to a mixture of (a), (b), (c) and (d).

21. A pigmented polyol composition for use in combination with a polyisocyanate in making aqueous-based pigmented coating formulations comprising:

(a) an aqueous mixture of an acid-containing polymeric polyol and a polyol free of acid groups, wherein the mixture has an average hydroxyl functionality of at least 1.5 and an acid number between about 15 and 200; and an amine or a blend of amines having an average active hydrogen functionality of at least 1.5, the amine or blend of amines being present in a sufficient amount to substantially neutralize the acid-containing polymeric polyol; and (b) two or more different pigments; and (c) an aqueous polymer emulsion comprising a polymer prepared by aqueous emulsion free radical polymerization, the polymer emulsion present in an amount sufficient to impart thixotropy to the mixture of (a) and (c).

* * * * *